United States Patent
Finn et al.

(10) Patent No.: US 10,751,945 B2
(45) Date of Patent: *Aug. 25, 2020

(54) INTERLOCKING BLOCK FRAMEWORK FOR THREE-DIMENSIONAL ADDITIVE MANUFACTURING

(71) Applicant: International Business Machines Corporation, Armonk, NY (US)

(72) Inventors: Peter G. Finn, Markham (CA); Rick A. Hamilton, II, Charlottesville, VA (US); Agueda Martinez Hernandez Magro, Jalisco (MX); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/837,111

(22) Filed: Dec. 11, 2017

(65) Prior Publication Data

US 2018/0236715 A1   Aug. 23, 2018

Related U.S. Application Data

(63) Continuation of application No. 15/439,996, filed on Feb. 23, 2017.

(51) Int. Cl.
*B29C 64/386* (2017.01)
*B33Y 50/02* (2015.01)
(Continued)

(52) U.S. Cl.
CPC ............ *B29C 64/386* (2017.08); *B33Y 10/00* (2014.12); *B33Y 50/02* (2014.12); *B33Y 80/00* (2014.12);
(Continued)

(58) Field of Classification Search
CPC ....... B29C 64/386; B33Y 10/00; B33Y 50/02; B33Y 80/00; G05B 19/4099; G05B 2219/35134; G05B 2219/49007
(Continued)

(56) References Cited

U.S. PATENT DOCUMENTS 9,400,910 B2 * 7/2016 Kumar .................. G06K 7/1426
9,418,503 B2 * 8/2016 Williams ................ G07F 17/26
(Continued)

OTHER PUBLICATIONS

RegDwight; LEGO Answers Forum, Dec. 8, 2016, LEGO Answers beta, pp. 1-7 (Year: 2016).*
Appendix P, 2017.

*Primary Examiner* — James J Lee
*Assistant Examiner* — Christopher W Carter
(74) *Attorney, Agent, or Firm* — Garg Law Firm, PLLC; Rakesh Garg; Aaron Pontikos

(57) ABSTRACT

A selection of a three-dimensional model by a user is received, and an interlocking block framework corresponding to the selected three-dimensional model is determined. The interlocking block framework includes one or more physical construction blocks configured to interlock with one another. A three-dimensional gap model is generated based upon the selected three-dimensional model and the interlocking block framework. The three-dimensional gap model is generated by removing a representation of the determined interlocking block framework from the selected three-dimensional model.

10 Claims, 6 Drawing Sheets

(51) Int. Cl.
  *B33Y 10/00*      (2015.01)
  *G05B 19/4099*    (2006.01)
  *B33Y 80/00*      (2015.01)

(52) U.S. Cl.
  CPC .............. *G05B 19/4099* (2013.01); *G05B 2219/35134* (2013.01); *G05B 2219/49007* (2013.01)

(58) Field of Classification Search
  USPC .......................................................... 700/98
  See application file for complete search history.

(56) References Cited

U.S. PATENT DOCUMENTS

| | | | |
|---|---|---|---|
| 2008/0109103 A1* | 5/2008 | Gershenfeld | B33Y 50/02 700/119 |
| 2015/0096266 A1* | 4/2015 | Divine | B33Y 50/02 53/452 |
| 2015/0145158 A1* | 5/2015 | Levine | B33Y 50/00 264/40.1 |

* cited by examiner

INTERLOCKING BLOCK FRAMEWORK FOR THREE-DIMENSIONAL ADDITIVE MANUFACTURING

TECHNICAL FIELD

The present invention relates generally to a method for three-dimensional printing. More particularly, the present invention relates to a method for determining an interlocking block framework for three-dimensional additive manufacturing.

BACKGROUND

Three-dimensional (3D) printing and other forms of additive manufacturing have been increasing in popularity in recent years. 3D printing is expected to continue growing in popularity for the foreseeable future. 3D printing refers to a process in which successive layers of material are deposited by a 3D printer or other additive manufacturing device under computer control to form a three-dimensional object. A number of additive processes exist to deposit the layers used to produce the 3D object. Some processes use heat to melt or soften material used to form the layers making up the 3D object. Examples of such processes include, but are not limited to, fused deposition modeling (FDM), selective laser melting (SLM), direct metal laser sintering (DMLS), selective laser sintering (SLS), and fused filament fabrication (FFF). Other 3D printing processes, such as stereolithography (SLA), use a curing process to harden liquid material used to form the layers of the 3D model.

Fused deposition modeling (FDM) remains one of the more popular 3D printing processes. In an FDM 3D printing process, a 3D object is produced from a model by extruding small beads of material which harden to form the layers. A thermoplastic filament or metal wire that is wound on a coil is unreeled to supply material to an extrusion nozzle. The extrusion nozzle heats the material before it is deposited and the flow of the material is controlled by the 3D printer. Typically, stepper motors or servo motors under control of a microcontroller are used to move the extrusion nozzle and adjust the flow of material in order to deposit the material on a build platform (or print bed) and build the 3D object layer by layer until a completed 3D object is formed. Typically, the 3D printer utilizes 3 axes of motion to generate the 3D object. A wide variety of thermoplastic materials are available for 3D printing including, but not limited to polylactic acid (PLA), acrylonitrile butadiene styrene (ABS), polycarbonate (PC), high-density polyethylene (HDPE), nylon, resins, metals, ceramics, and high impact polystyrene (HIPS).

The time required to print a 3D object is dependent upon the size and complexity of the 3D object. Currently, creating a 3D object from a 3D model requires starting with a blank build platform and building the object up from multiple layers to form the completed object. The build platform is a surface upon which the thermoplastic material is deposited by the extrusion nozzle during the printing process. A simple object, such as a simple nutcracker, may require several hours for printing. Larger objects or more complex objects may take a long time to print and may consume a large amount of filament.

Hereinafter, a "3D printing" refers to an additive manufacturing process in which a three-dimensional physical object is built from a 3D model using a 3D printing device or other additive manufacturing device. Hereinafter, a "3D model" refers to a mathematical representation of a three-dimensional object. For example, a 3D object can be expressed by a canonical model such as an XML descriptor or other 3D mesh model description.

SUMMARY

The illustrative embodiments provide a method, system, and computer program product. An embodiment includes a method that includes receiving a selection of a three-dimensional model by a user, and determining an interlocking block framework corresponding to the selected three-dimensional model. The interlocking block framework includes one or more physical construction blocks configured to interlock with one another. The method further includes generating a three-dimensional gap model based upon the selected three-dimensional model and the interlocking block framework. The three-dimensional gap model is generated by removing a representation of the determined interlocking block framework from the selected three-dimensional model.

An embodiment includes a computer usable program product. The computer usable program product includes one or more computer-readable storage devices, and program instructions stored on at least one of the one or more storage devices. The one or more storage devices include program instructions to receive a selection of a three-dimensional model by a user, and program instructions to determine an interlocking block framework corresponding to the selected three-dimensional model. The interlocking block framework includes one or more physical construction blocks configured to interlock with one another. The one or more storage devices further include program instructions to generate a three-dimensional gap model based upon the selected three-dimensional model and the interlocking block framework. The three-dimensional gap model is generated by removing a representation of the determined interlocking block framework from the selected three-dimensional model.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories. The stored program instructions include program instructions to receive a selection of a three-dimensional model by a user, and program instructions to determine an interlocking block framework corresponding to the selected three-dimensional model, the interlocking block framework including one or more physical construction blocks configured to interlock with one another. The stored program instructions further include program instructions to generate a three-dimensional gap model based upon the selected three-dimensional model and the interlocking block framework. The three-dimensional gap model is generated by removing a representation of the determined interlocking block framework from the selected three-dimensional model.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
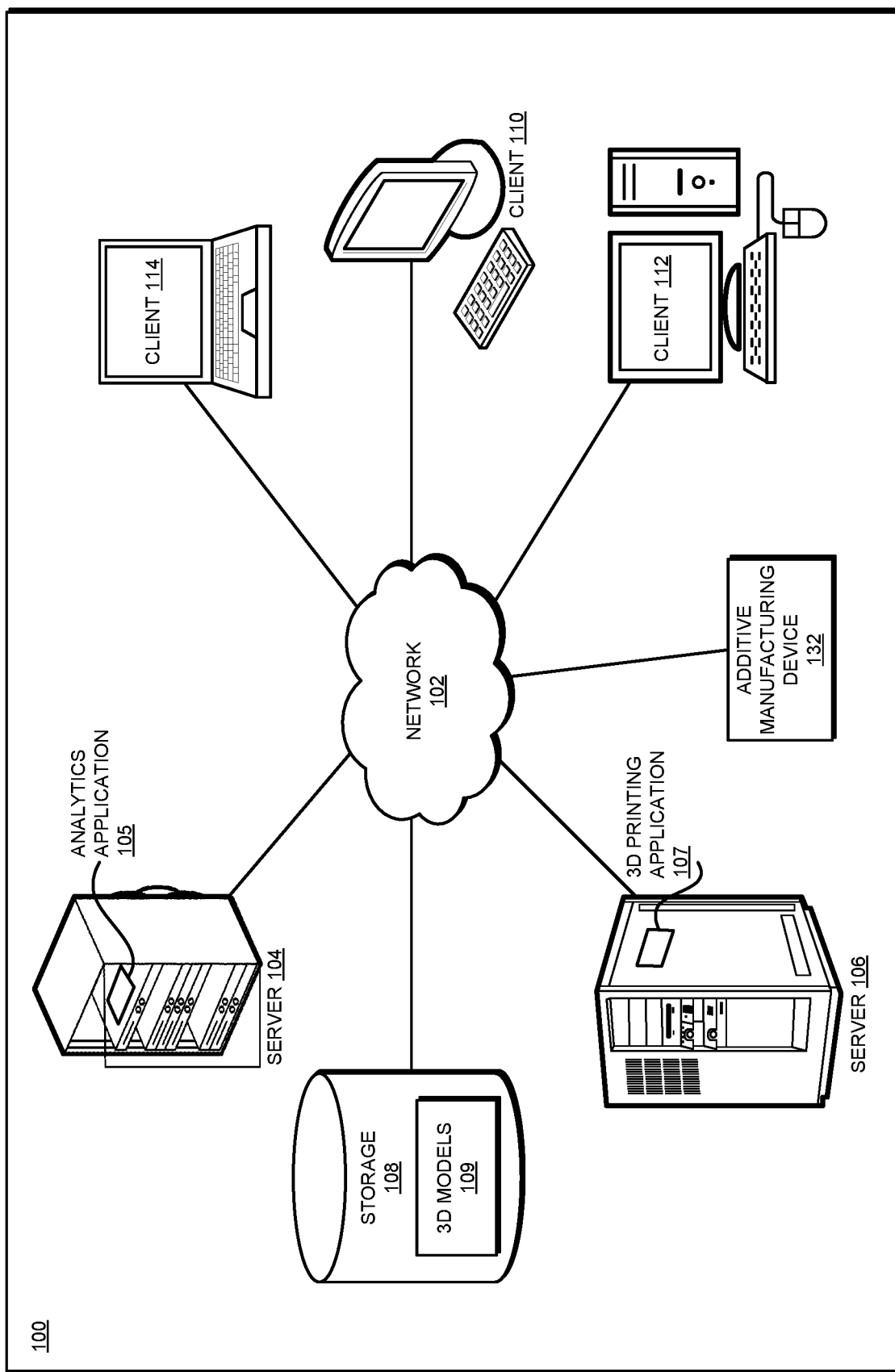
FIG. 1 depicts a block diagram of a network of data processing systems in which illustrative embodiments may be implemented.

The illustrative embodiments described herein generally relate to determining an interlocking block framework for three-dimensional additive manufacturing in which a three-dimensional (3D) model that is desired be produced as a physical 3D object is determined, a framework corresponding to the 3d model that is to be formed of one or more interlocking blocks is determined, and a gap model is generated based upon the 3D model and the interlocking block framework. The interlocking block framework is an arrangement of one or more interlocking blocks that are coupled together in a predetermined configuration to serve as a framework upon which a gap object represented by the gap model is to be built during the 3D printing process. The gap object is the portion of the desired 3D object that does not include the interlocking block framework that is depositing over the interlocking block framework during the printing process to produce the final desired physical object. In one or more embodiments, the interlocking blocks include physical construction blocks, such as Lego™ blocks, designed and/or configured to interlock within one another to form a larger three-dimensional physical object.

In one or more embodiments, the gap model is calculated by computationally removing a representation of the determined interlocking block framework from the 3D model such that the gap model includes a void space configured and dimensioned such that the interlocking block framework is contained within the gap model when the gap model is produced as a physical 3D object by a 3D printer or other additive manufacturing device. In illustrative embodiments, build instructions for the interlocking block framework are generated and provided to a user. In one or more embodiments, the build instructions include an identification of one or more interlocking blocks to be used to construct the framework as well as instructions instructing the user how the interlocking block framework is to be built. In particular embodiments, the build instructions may include a description and/or identification of the particular size and/or shapes of interlocking blocks to be used for the interlocking block framework as well as one or more visual aids illustrating how the interlocking blocks are to be interlocked with one another to form the framework.

In illustrative embodiments, once the user constructs the interlocking block framework using the specified interlocking blocks in the specified configuration, the user places the interlocking block framework on the build platform of the 3D printer device or other additive manufacturing device and provides an acknowledgement indicated that the interlocking block framework has been assembled and placed upon the build platform. The 3D printer device then prints the generated gap model as a 3D object over the interlocking block framework upon the build platform to form the originally desired physical 3D object.

In accordance with one or more embodiments, a user may select the 3D object to be printed by displaying a catalog of available 3D models to the user and allowing the user to select the desired 3D model from the catalog. In particular embodiments, the 3D models in the catalog are obtained from a social network providing previously analyzed 3D models. In other particular embodiments, a user may upload an image, such as a photograph, illustration or other image, of a desired object and the image is sent to a server including a cognitive and/or analytics system embodied within one or more servers. The cognitive system then performs image recognition to recognize and select the 3D object that the user intends to build. In still other particular embodiments, the user describes the desired object using a voice input and the cognitive system uses voice analytics to recognize and select the 3D object that user intends to build. In still another particular embodiment, the user may provide a text description of the desired 3D object and the cognitive system may determine the 3D object that the user intends to build using text analytics.

A cognitive system is an artificial intelligence application executing on data processing hardware. A cognitive system answers questions pertaining to a given subject-matter domain presented in natural language.

Typically, a cognitive system is provided access to a collection of domain specific information based on which the cognitive system answers questions pertaining to that domain. For example, a cognitive system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain. In accordance with various embodiments, a cognitive system is provided access to information regarding 3D models.

In one or more embodiments, the cognitive system or a separate application residing on a server computes the interlocking block framework corresponding to the selected 3D model by breaking or resolving the 3D model into one or more predefined layers of interlocking blocks of particular heights, widths, and lengths and determining a combination of one or more appropriate interlocking blocks that will fit within the one or more predefined layers.

In a particular embodiment, interconnectable blocks of a particular size and shape are used in which each interconnecting block has a predefined height x and the 3D object to be printed has a predefined height H. Accordingly, the number of interlocking block layers required to form the interlocking block framework will be equal to or less than a value of H/x. Depending upon the particular geometry, size, and configuration of the 3D object. If each interconnecting block has a predefined width y and the 3D object to be printed has a predefined width W, the number of interconnecting blocks required in the width of the framework is equal to or less than W/y. If each interconnecting block has a predefined length z and the 3d object to be printed has a predefined length L, the number of interconnecting blocks required in the length of the framework is equal to or less than L/z. In particular embodiments, the cognitive system determines the configuration/shape, size, and number of required interlocking blocks of the interlocking block framework in order to minimize the amount of material used and/or print time of the gap model.

In various embodiments, the determined interlocking block framework is subtracted or otherwise removed or disregarded from the 3D object model to form the 3D gap model representing the remaining portion of the 3D object model. The 3D gap model represents the portion of the 3D object that will actually be printed by the 3D printer device. Accordingly, the print volume, referring to the volume actually printed by the 3D printer device, is equal to the volume of the interlocking block framework subtracted from the volume of the 3D object. In accordance with one or more embodiments, the cognitive system may optimize the 3D gap model by optimizing the orientation of the 3D gap model during printing. For example, it may be more optimal to print a particular 3D gap model in an upside down orientation upon the build plate of the 3D printer device. In still other embodiments, the cognitive system or application may adjust other parameters of the 3D gap model such as the infill percentage of the printed 3D gap model, the extruder nozzle temperature, and any other parameter of the 3D printing process.

In one or more embodiments, the cognitive system and/or a server application generates build instructions instructing the user regarding how the user is to assemble the interlocking block framework using one or more interlocking blocks and presents the build instructions to the user. In some embodiments, the build instructions may include an indication of a location on the build plate of the 3D printer at which the interlocking block framework is to be placed during printing of the gap model over the interlocking block framework. In still other embodiments, the 3D printer may be configured to automatically detect the location of the interlocking block framework on the build plate and print the gap model accordingly. In particular embodiments, the build instructions are presented to the user within a display of a client device such as a computer or mobile device.

In accordance with various embodiments, the cognitive system or server application generates machine-readable instructions corresponding to the 3D gap model that are interpreted and/or executed by the 3D printer device in order to print the 3D gap model as a physical 3D object. In particular embodiments, the machine-readable instructions are embodied within a G-code file format. In still other embodiments, the machine-readable instructions may be embodied within any suitable numerical control system programming language format.

In one or more embodiments, once the user has assembled the interlocking block framework in the instructed manner and placed the interlocking block framework, the user may provide an acknowledgement to either the cognitive system or the application residing on the server indicating that the interlocking block framework has been placed on the build plate. In accordance with various embodiments, the user may provide the acknowledgement using a user interface associated with a client device or the 3D printing device.

Upon receiving the acknowledgment, in one or more embodiments, the cognitive system or the server application sends the machine-readable instructions to the 3D printer device. In response, the 3D printer device prints the 3D gap model as a 3D physical object over the interlocking block framework to produce the originally desired physical 3D object. Accordingly, the user is provided with a physical 3D object having the desired outward appearance having a portion of the internal volume filled by the interlocking block framework. In some embodiments, filament costs may be minimized by maximizing the volume taken up by the interlocking block framework. In still other embodiments, the interlocking block framework may have a greater strength than could be obtained from a purely 3D printed object. In such embodiments, the resulting 3D printed object may be made stronger as a result of the interlocking block framework providing support to the 3D gap object.

The illustrative embodiments are described with respect to certain types of additive manufacturing processes, additive manufacturing devices, transmissions, validations, responses, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
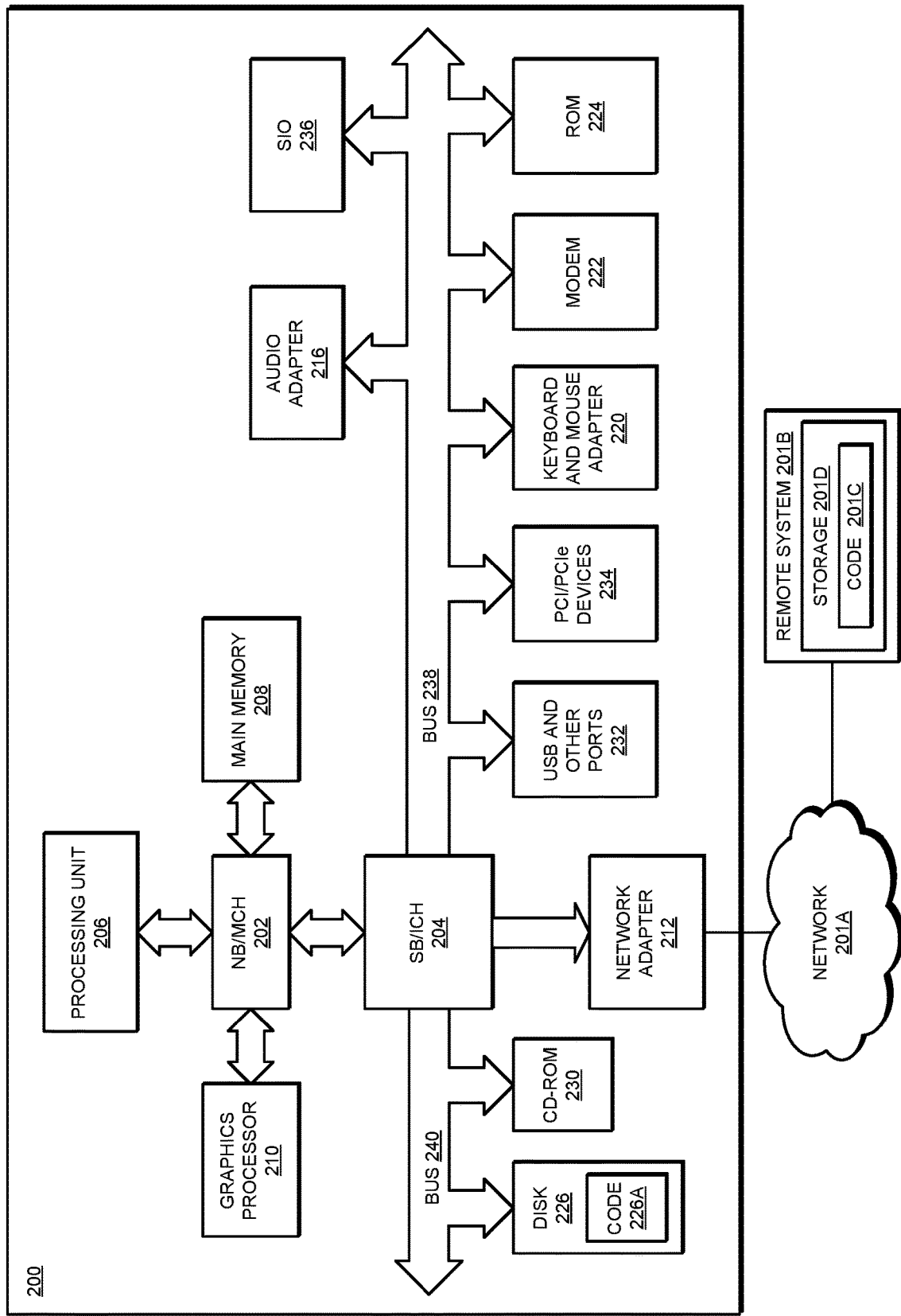
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store one or 3D models available for selection and printing by a user. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Additive manufacturing device 132 is an example of a device described herein. For example, additive manufacturing device 132 can take the form of a 3D printer device or any other suitable additive manufacturing device. Any software application described as executing in another data processing system in FIG. 1 can be configured to execute in additive manufacturing device 132 in a similar manner. Any data or information stored or produced in another data processing system in FIG. 1 can be configured to be stored or produced in additive manufacturing device 132 in a similar manner.

Analytics application 105 of server 104 implements an embodiment of a cognitive system described herein. 3D printing application 107 implements one or more 3D printing or other additive manufacturing processes as described herein with respect to various embodiments.

Servers 104 and 106, storage unit 108, and clients 110, 112, and 114, and additive manufacturing device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD)

or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
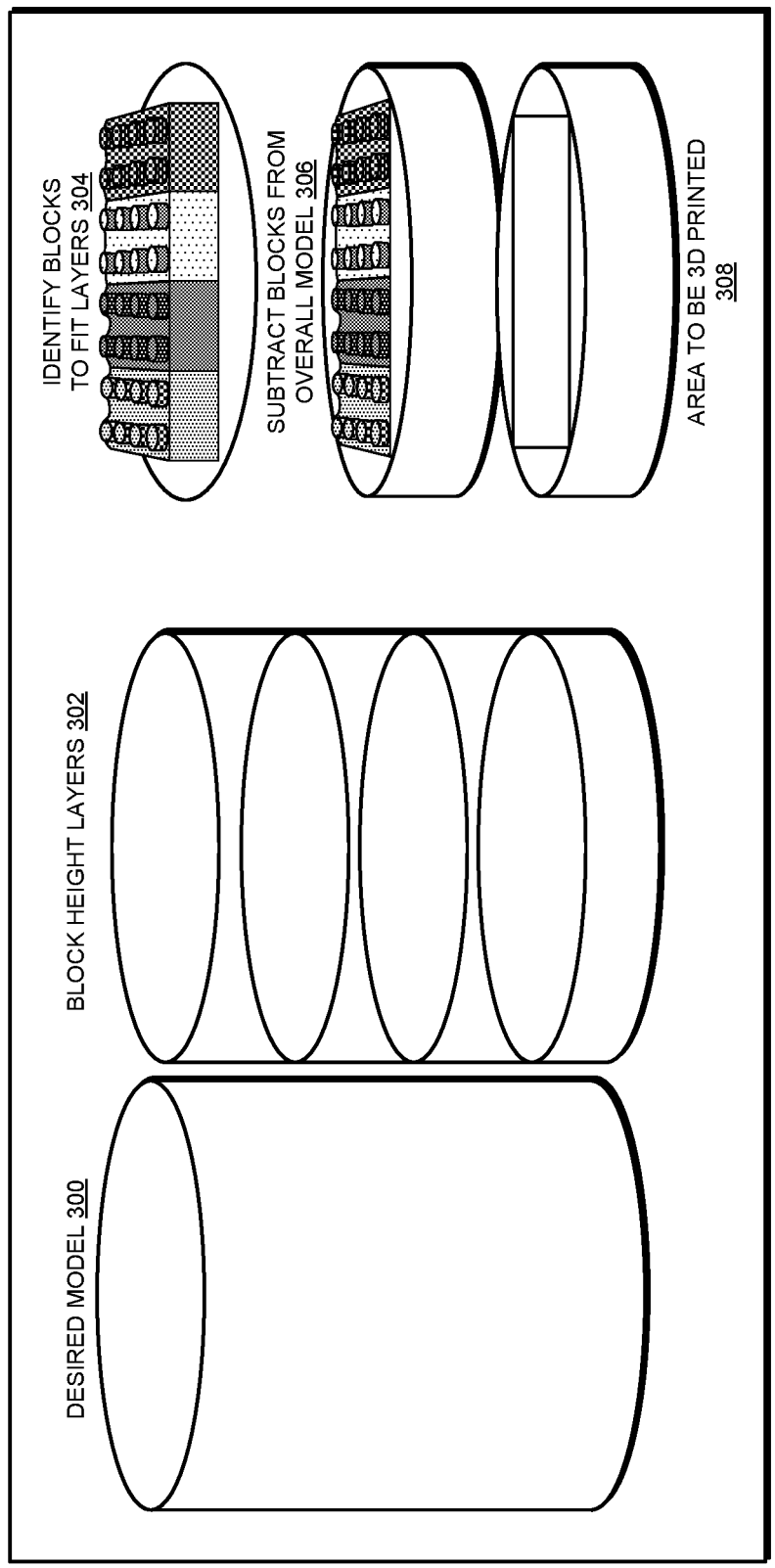
FIG. 3 depicts an example process in accordance with an illustrative embodiment.

With respect to FIG. 3, this figure depicts an example process of determining an interlocking block framework for three-dimensional additive manufacturing in accordance with an illustrative embodiment. In 300, a desired 3D model 300 is obtained. In 302, the desired 3D model is segmented into interlocking block height layers each of a predetermined height. In particular embodiments, the predetermined height of each block height layer is substantially equal to the height of each individual interlocking block. In still other embodiments, the predetermined height of each block height layer may be formed from a stacking of multiple interlocking blocks. In 304, the interlocking blocks that have to be fit within the layer are identified to form the interlocking block framework described herein. In 306, the interlocking block framework is subtracted from the overall desired model to produce a 3D gap model. In 308, the 3D gap model is identified as the area to be printed by the 3D printing device.

Figure 4:
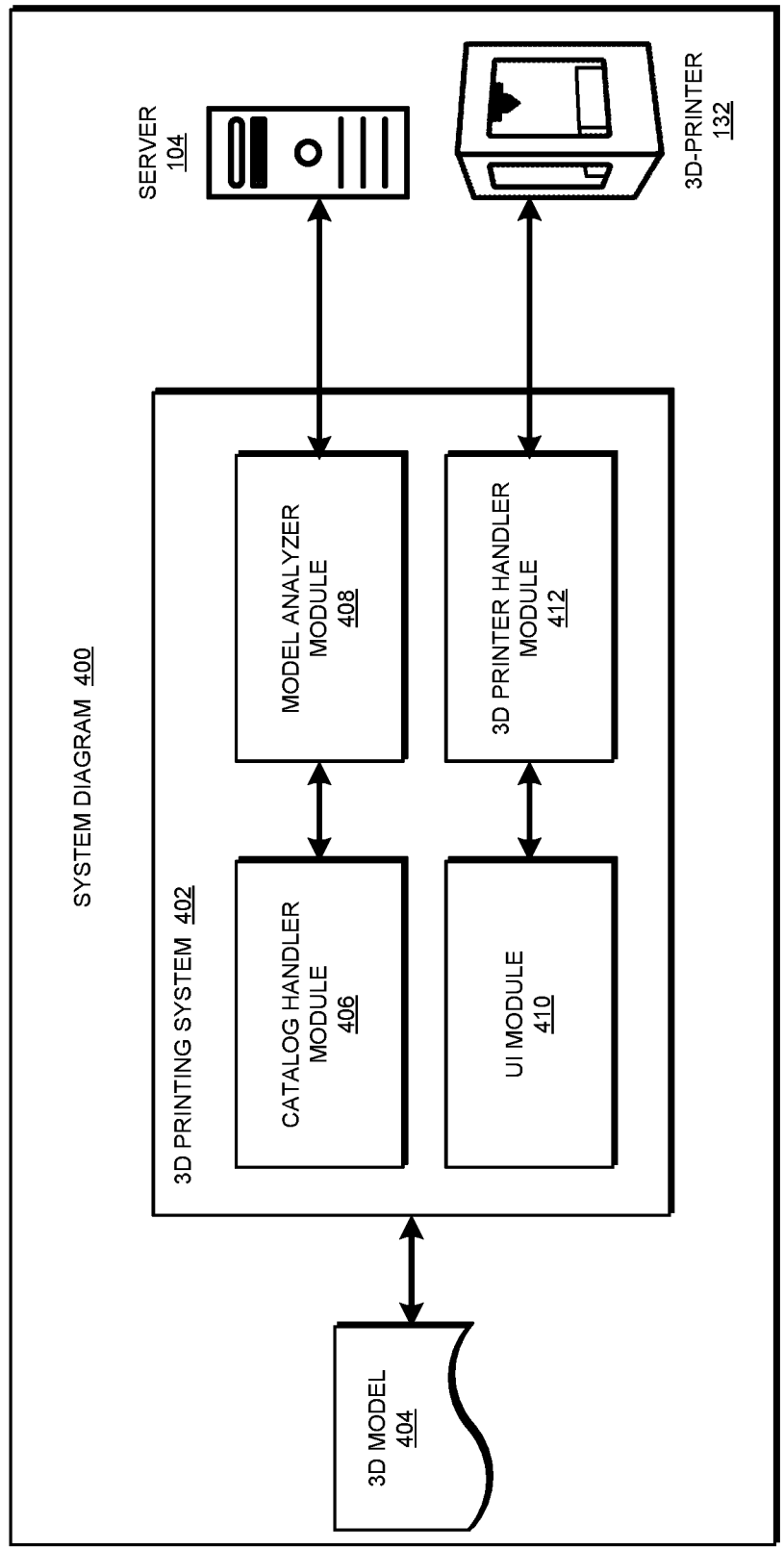
FIG. 4 depicts a block diagram of an example system in accordance with an illustrative embodiment.

With respect to FIG. 4, this figure depicts a block diagram of an example system 400 for determining an interlocking block framework for three-dimensional additive manufacturing in accordance with an illustrative embodiment. System 400 includes a 3D printing system 402 in communication with server 104 and 3D-printer device 132. In one or more embodiments, 3D printing system 402 is embodied within server 106 described in FIG. 1 and includes 3D printing application 107. In one or more embodiments, server 104 includes the analytics application 105 implementing a cognitive system as described in various embodiments herein. 3D printing device 132 may including any 3D printer or other additive manufacturing device as described herein.

In one or more embodiments, 3D printing system 402 is configure to receive a 3D model 404 desired by a user and communicate 3D model 404 to server 104. 3D printing system 402 includes a catalog handler module 406, a model analyzer module 408, a user interface (UI) module 410, and a 3D printer handler module 412. In one or more embodiments, catalog handler module 406 is configured to provide a collection of 3D models to a user to allow the user to select a particular 3D model as well as accept new 3D models. In particular embodiments, catalog handler module 406 retrieves the 3D models from storage 108. Model analyzer module 408 is configured to trigger a call to the cognitive system provided by server 104 to provide one or more functions including analysis of a selected 3D model performing calculations to determine the interlocking blocks that will be used to construct the interlocking block framework, generating the 3D gap model based upon the selected 3D model and the determined interlocking block framework, generate build instructions for instructing a user to construct the interlocking block framework, and generating machine-readable instructions to be provided to 3D printer device 132 to instruct the 3D printer device 132 to print the 3D gap model.

UI module 410 is configured to communicate with a user to enable displaying of 3D models to a user, receiving user inputs such as a selection of a 3D model from the user, and displaying build instructions for the interlocking block framework. 3D printer handler module 412 is configured to send instructions to 3D printer device 132 instructing 3d printer device 132 to print the calculated 3D gap model.

Figure 5A:
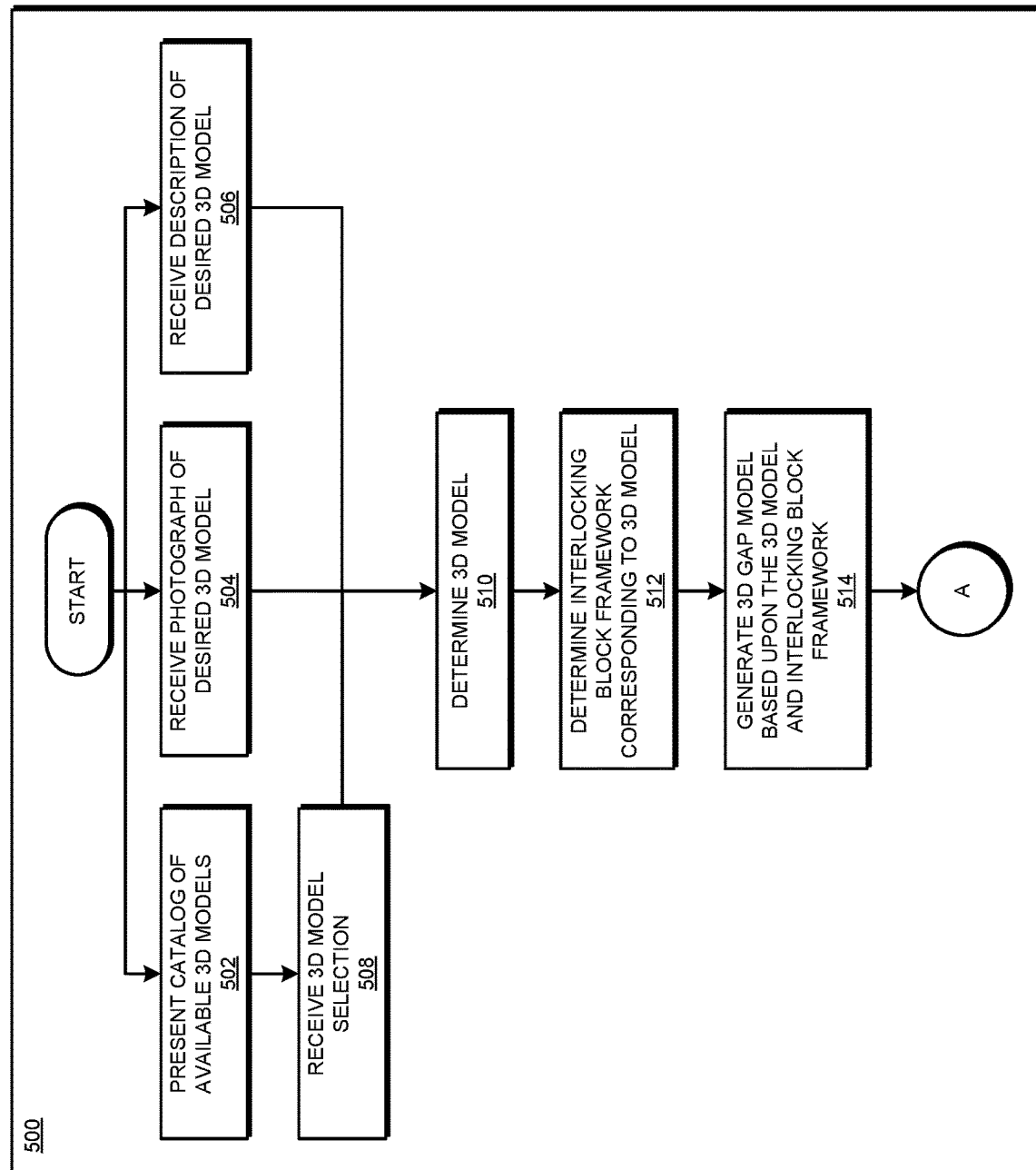
FIGS. 5A-5B depict a flowchart of an example process for determining an interlocking block framework for three-dimensional additive manufacturing in accordance with an illustrative embodiment.
Figure 5B:
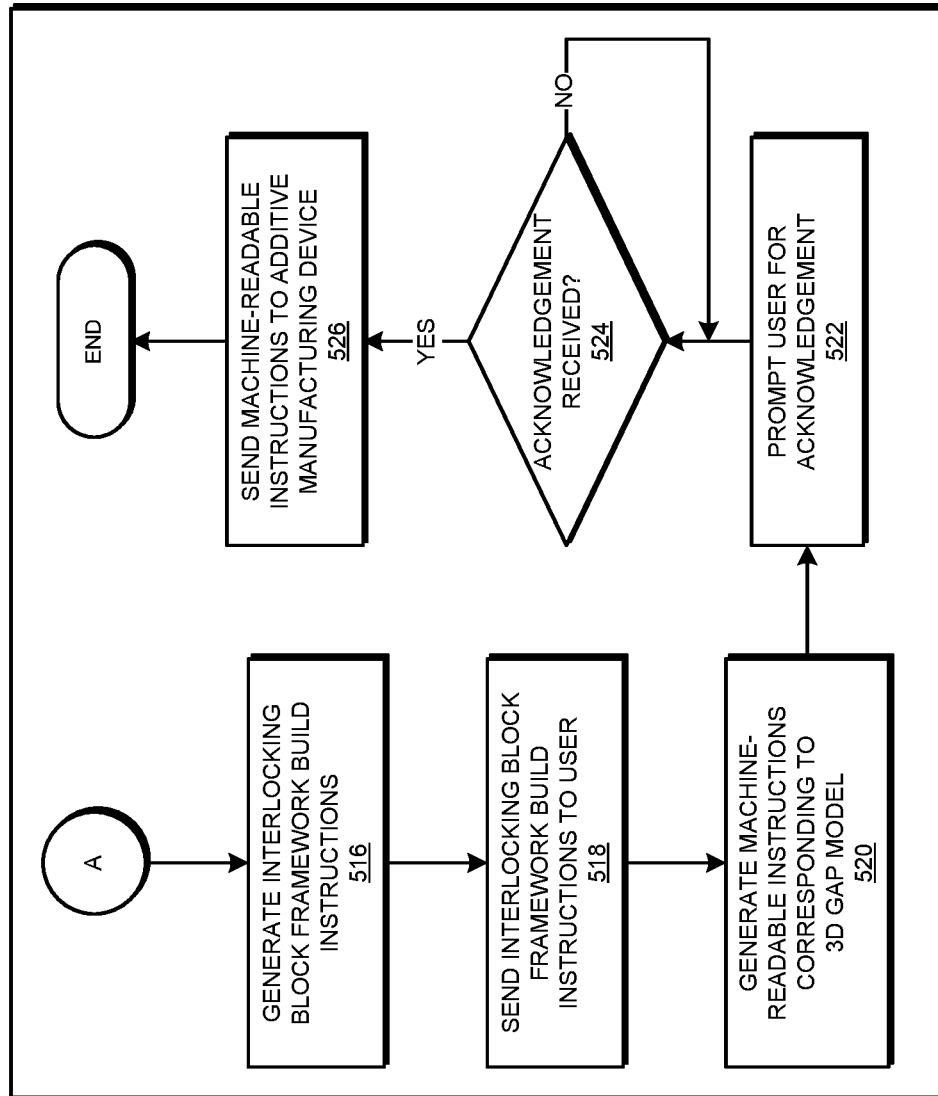

With reference to FIGS. 5A-5B, these figures depict a flowchart of an example process for determining an interlocking block framework for three-dimensional additive manufacturing in accordance with an illustrative embodiment. Process 500 can be implemented in application 107 or application 105 of FIG. 1. In block 502, a catalog of available 3D models is presented to a user. In one or more embodiments, application 107 or application 105 retrieves the catalog of available 3D models from storage 108. In particular embodiments, application 107 or application 105 displays the catalog of available 3D models to a user via a display of one or more of client 110, client 112, or client 114. In block 508, application 107 or application 105 receives a selection/designation of a particular 3D model from the catalog of available 3D models by a user. In particular embodiments, the user may select the particular 3D model using a user interface of one or more of client 110, client 112, or client 114.

Alternately, in block 504, application 107 or application 105 receives a photograph or other image of a particular object that the user desires to reproduce as a printed 3D object. In particular embodiments, the image is sent to server 104 and a cognitive system image recognition to recognize and select the 3D object that the user intends to build.

Alternately, in block 506, application 107 or application 105 receives a description of the desired 3D model from the user. In a particular embodiment, the user describes the desired object using a voice input to one or more of client 110, client 112, or client 114 and the cognitive system of server 104 uses voice analytics to recognize and select the 3D object that user intends to build. In still another particular embodiment, the user may provide a text description of the desired 3D object model and the cognitive system may determine the 3D object that the user intends to build using text analytics.

In block 510, the 3D object model selected and/or described by the user as discussed above with respect to blocks 508, 504, and 506) is determined. In block 512, the interlocking block framework corresponding to the selected 3D object model is determined. In one or more embodiments, the cognitive system of server 104 and/or application 107 residing on server 106 determines the interlocking block framework corresponding to the selected 3D model by breaking the 3D model into one or more predefined layers of interlocking blocks of particular heights, widths, and lengths and determining the appropriate interlocking blocks that will fit within the one or more predefined layers.

In one or more embodiments, the cognitive system is configured to select specific interconnecting block types based on a desired/expected mass of an object. For example, a user may desire to prepare a reproduction of a soccer ball and a bowling ball for display at a sports exposition. While the soccer ball and bowling ball may have the same or similar dimensions, one would expect the bowling ball to be much heavier than the soccer ball. In such situations, the cognitive system may include an algorithm configured to select a small number of larger lightweight blocks with significant air gaps for the interlocking block framework of the soccer ball, where a greater number of smaller and denser blocks with much less air space may be selected for the interlocking block framework of the bowling ball. Similarly, the cognitive system may include logic configured to change the selection of the type and number of blocks for the interlocking block framework based upon the desired structural integrity of the object.

In block 514, the 3D gap model is generated based upon the selected 3D object model and the generated interlocking block framework. In one or more embodiments, the gap model is calculated by computationally removing a representation of the determined interlocking block framework from the 3D model such that the gap model includes a void space configured and/or dimensioned such that the interlocking block framework is contained within the gap model when the gap model is produced as a physical 3d object by a 3D printer or other additive manufacturing device. In various embodiments, the determined interlocking block framework is subtracted from the 3D object model to form the 3D gap model representing the remaining portion of the 3D object model. As discussed above, the 3D gap model represents the portion of the 3D object that will actually be printed by the additive manufacturing device 132 such as a 3D printer device.

In block 516, build instructions for the interlocking block framework are generated. In one or more embodiments, the build instructions include an identification of one or more interlocking blocks to be used to construct the framework as well as instructions instructing the user how the interlocking block framework is to be built. In particular embodiments, the build instructions may include a description of the particular sizes and/or shapes of interlocking blocks to be used for the interlocking block framework as well as a one or more visual aids illustrating how the interlocking blocks are to be interlocked with one another to form the framework. In block 518, the interlocking block framework build instructions are sent to the user. In particular embodiments, the interlocking block framework build instructions are sent to the user on a display of one or more of client 110, client 112, or client 114. In another embodiment, the interlocking block framework build instructions are sent to a machine such as a robot or other suitable device configured to build the interlocking block framework in response to receiving the interlocking block framework build instructions.

In block 522, the user is prompted for an acknowledgment indicating that the interlocking block framework has been assembled and placed upon the build platform. In one or more embodiments, upon receiving the interlocking block framework build instructions, the user constructs the interlocking block framework using the specified interlocking blocks in the specified configuration, places the interlocking block framework on the build platform of the 3D printer device or other additive manufacturing device and responds to the acknowledgment indicating that the interlocking block framework has been assembled and placed upon the build platform. In block 524, it is determined whether the acknowledgment has been received. If the acknowledgement has not been received, the process returns to block 524.

In block 526, machine-readable instructions corresponding to the 3D gap model are sent to additive manufacturing device 132 such as a 3D printer device. The machine-readable instructions are configured to instruct additive manufacturing device 132 to print the calculated 3D gap model using a 3D printing process. In response to receiving the machine-readable instructions, additive manufacturing device 132 prints the generated gap model as a 3D object over the interlocking block framework upon the build platform to form the originally desired physical 3D object. Accordingly, the user is provided with a physical 3D object having the desired outward appearance having a portion of the internal volume filled by the interlocking block framework. Process 500 is ended thereafter.

Thus, a computer implemented method is provided in the illustrative embodiments for determining an interlocking block framework for three-dimensional additive manufacturing and other related features, functions, or operations. Where an embodiment or a portion thereof is described with respect to a type of device, the computer implemented method or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving a selection of a three-dimensional model by a user, wherein the three-dimensional model comprises a mathematical representation of a physical three-dimensional object;
determining an interlocking block framework corresponding to the selected three-dimensional model, the interlocking block framework including one or more physical construction blocks configured to interlock with one another, wherein the determined interlocking block framework maximizes a volume taken up by an interior volume of the three-dimensional model;
generating build instructions, the build instructions comprising a descriptive instruction describing a physical construction block from the one or more physical construction blocks, and a visual aid illustrating a manner in which the physical construction block is to be interlocked to form the interlocking block framework;
detecting, via an acknowledgement from an additive manufacturing device, a placement of the interlocking block framework at a position relative to the additive manufacturing device; and
generating a three-dimensional gap model based upon the selected three-dimensional model and the interlocking block framework, the three-dimensional gap model representing a portion of the physical three-dimensional object intended to be printed using an additive manufacturing device, the three-dimensional gap model being generated by removing a representation of the determined interlocking block framework from the selected three-dimensional model, wherein machine-readable instructions corresponding to the three-dimensional gap model are configured to instruct an additive manufacturing device to print the three-dimensional gap model using a three-dimensional printing process.

2. The method of claim 1, further comprising:
generating machine-readable instructions corresponding to the three-dimensional gap model.

3. The method of claim 2, further comprising:
sending the machine-readable instructions to an additive manufacturing device.

4. The method of claim 3, wherein the additive manufacturing device is configured to print the three-dimensional gap model as a physical object over the interlocking block framework.

5. The method of claim 1, wherein generating the three-dimensional gap model includes subtracting the interlocking block framework from the selected three-dimensional model.

6. The method of claim 1, wherein the three-dimensional gap model includes a void space configured such that the interlocking block framework is contained within the three-dimensional gap model when the three-dimensional gap model is produced as a physical object by an additive manufacturing process.

7. The method of claim 1, wherein the selection of the three-dimensional model includes:
presenting a catalog of available three-dimensional models to a user; and
receiving a selection of the selected three-dimensional model from the user.

8. The method of claim 1, wherein the selection of the three-dimensional model includes at least one of receiving an image representative of a desired three-dimensional model and receiving a description of the desired three-dimensional model.

9. The method of claim 8, wherein the description of the desired three-dimensional model includes at least one of a voice input and a text input.

10. The method of claim 1, further comprising generating build instructions for the interlocking block framework, the build instructions including at least one of an identification of the particular interlocking blocks to be used for the interlocking block framework and a visual aid illustrating how the interlocking blocks are to be interlocked with one another.

* * * * *